United States Patent
Fukumoto et al.

[11] Patent Number: 6,138,528
[45] Date of Patent: Oct. 31, 2000

[54] AGRICULTURAL TRACTOR

[75] Inventors: Toshiya Fukumoto, Sakai; Masao Takagi, Hashimoto, both of Japan

[73] Assignee: Kubota Corporation, Japan

[21] Appl. No.: 09/393,674

[22] Filed: Sep. 10, 1999

[30] Foreign Application Priority Data

May 18, 1999 [JP] Japan .................................. 11-137442

[51] Int. Cl.[7] .................................................. B60K 17/06
[52] U.S. Cl. ................................................................ 74/745
[58] Field of Search ...................................................... 74/745

[56] References Cited

U.S. PATENT DOCUMENTS

| | | | |
|---|---|---|---|
| 4,590,817 | 5/1986 | Bennett ........................................ | 74/473 |
| 4,802,384 | 2/1989 | Schwarz et al. ............................ | 74/745 |
| 5,088,968 | 2/1992 | Horii et al. ................................. | 475/124 |
| 5,117,702 | 6/1992 | Rodeghiero et al. ....................... | 74/359 |
| 5,249,481 | 10/1993 | Lasoen ........................................ | 74/745 |
| 6,076,430 | 6/2000 | Huber et al. ................................ | 74/745 |

FOREIGN PATENT DOCUMENTS

| | | |
|---|---|---|
| 0737828 | 10/1996 | European Pat. Off. . |
| 0769641 | 4/1997 | European Pat. Off. . |
| 9240297 | 9/1997 | Japan . |

OTHER PUBLICATIONS

Operator's Manual for Kubota Tractor models M7580, M8580, M9580, 6 pages—(7 sides).
Ford 145 to 210 PTO hp GENESIS™ 70 Series Tractors 8670 8770 8870 8970. 4 pages.

*Primary Examiner*—Dirk Wright
*Attorney, Agent, or Firm*—Webb Ziesenheim Lodgson Orkin & Hanson, P.C.

[57] ABSTRACT

A propelling transmission for an agricultural tractor includes a main change speed mechanism, an auxiliary change speed mechanism, and a high/low change speed mechanism for providing two, high and low, speeds with a smaller transmission ratio than a transmission ratio between speed stages of the main change speed mechanism. The main change speed mechanism, auxiliary change speed mechanism and high/low change speed mechanism are arranged in series. Speeds in a low-speed range for an operational run among speeds provided by the main change speed mechanism and auxiliary change speed mechanism are combined with the two speeds provided by the high/low change speed mechanism. The propelling transmission prevents the high/low change speed mechanism from being operated to the low speed in a high-speed range for a road run among the speeds provided by the main change speed mechanism and auxiliary change speed mechanism, whereby the high-speed range is combined only with the high speed provided by the high/low change speed mechanism.

12 Claims, 11 Drawing Sheets

[Forward]

| Positions | Main | | | | Auxiliary | | Hi and Lo | |
|---|---|---|---|---|---|---|---|---|
| | 1 | 2 | 3 | 4 | L | H | Lo | Hi |
| 1 | O | | | | O | | O | |
| 2 | O | | | | O | | | O |
| 3 | | O | | | O | | O | |
| 4 | | O | | | O | | | O |
| 5 | | | O | | O | | O | |
| 6 | | | O | | O | | | O |
| 7 | | | | O | O | | O | |
| 8 | | | | O | O | | | O |
| 9 | O | | | | | O | | O |
| 10 | | O | | | | O | | O |
| 11 | | | O | | | O | | O |
| 12 | | | | O | | O | | O |

(B)

[Rearward]

| Positions | Main | | | | Auxiliary | |
|---|---|---|---|---|---|---|
| | 1 | 2 | 3 | 4 | L | H |
| 1 | O | | | | O | |
| 2 | | O | | | O | |
| 3 | | | O | | O | |
| 4 | | | | O | O | |
| 5 | O | | | | | O |
| 6 | | O | | | | O |
| 7 | | | O | | | O |
| 8 | | | | O | | O |

FIG. 11

[Forward]

| Positions | Main | | | | Auxiliary | | Hi and Lo | |
|---|---|---|---|---|---|---|---|---|
| | 1 | 2 | 3 | 4 | L | H | Lo | Hi |
| 1 | O | | | | O | | O | |
| 2 | O | | | | O | | | O |
| 3 | | O | | | O | | O | |
| 4 | | O | | | O | | | O |
| 5 | | | O | | O | | O | |
| 6 | | | O | | O | | | O |
| 7 | | | | O | O | | O | |
| 8 | | | | O | O | | | O |
| 9 | O | | | | | O | O | |
| 10 | O | | | | | O | | O |
| 11 | | O | | | | O | | O |
| 12 | | | O | | | O | | O |
| 13 | | | | O | | O | | O |

6,138,528

AGRICULTURAL TRACTOR

BACKGROUND OF THE INVENTION

1. Field of the Invention

This invention relates to an agricultural tractor, and more particularly to an improvement in a propelling transmission for use in an agricultural tractor.

2. Description of the Related Art

A propelling transmission of the type noted above is disclosed in Japanese Patent Publication Kokai H9-240297, for example. In this prior transmission, a main change speed mechanism and an auxiliary change speed mechanism are combined to perform change speed in multiple stages (eight stages). It is proposed in the above publication to connect, in series to the two change speed mechanisms, a high/low change speed mechanism for performing change speed in two stages with a smaller transmission ratio than the transmission ratio between speed stages of the main change speed mechanism.

In the propelling transmission having the above construction, the number of speeds (eight speeds) provided by the combination of the main change speed mechanism and auxiliary change speed mechanism is combined with the change speed in two stages provided by the high/low change speed mechanism. Thus, a total of 16 speeds is provided by the transmission. In addition, an engageable and disengageable super-reduction mechanism may be connected in series to the change speed mechanisms to provide a total of 32 speeds, doubling the above number of speeds, for a forward drive range.

With as many as 32 speeds available as noted above, it is convenient in performing an agricultural operation since speed may be changed by finely defined stages to suit the operation while running at a relatively low speed in a speed range for an operational run. However, the 32 speeds are too many for a speed range for a road run which requires a relatively high speed. Operability and handling convenience are all the worse for the numerous speed stages, which poses a disadvantage in practical use.

SUMMARY OF THE INVENTION

This invention has been made having regard to the state of the art noted above. A primary object of the invention is to provide an agricultural tractor of practical utility with excellent operability and handling convenience in carrying out shifting operations, which allows appropriate speeds to be set for varied agricultural operations in a speed range for an operational run, and allows a selection of not too fine-defined speed stages from a speed range for a road run.

The above object is fulfilled, according to this invention, by an agricultural tractor comprising an engine, a pair of drive wheels, and a propelling transmission disposed between the engine and the drive wheels for transmitting drive from the engine in a plurality of speeds. The propelling transmission includes a main change speed mechanism, an auxiliary change speed mechanism, and a high/low change speed mechanism for providing two, high and low, speeds with a smaller transmission ratio than a transmission ratio between speed stages of the main change speed mechanism. The main change speed mechanism, auxiliary change speed mechanism and high/low change speed mechanism are arranged in series. Speeds in a low-speed range for an operational run among speeds provided by the main change speed mechanism and the auxiliary change speed mechanism are combined with the two speeds provided by the high/low change speed mechanism. The propelling transmission further includes a check device for preventing the high/low change speed mechanism from being operated to the low speed, in a high-speed range for a road run among the speeds provided by the main change speed mechanism and the auxiliary change speed mechanism, whereby the high-speed range is combined only with the high speed provided by the high/low change speed mechanism.

With this construction, the tractor may run at speeds, in the speed range for an operational run, suited to varied agricultural operations. Further, the speed range for a road run includes speeds not excessively fine-defined. The tractor may run on the road by selecting a suitable speed. Thus, the agricultural tractor according to this invention has practical utility with excellent operability and handling convenience in carrying out shifting operations.

BRIEF DESCRIPTION OF THE DRAWINGS

FIG. 10 shows tables of a relationship between speed stages and change speed mechanisms;

FIG. 11 shows a table of a relationship between forward speed stages and change speed mechanisms in a different embodiment.

DETAILED DESCRIPTION OF THE PREFERRED EMBODIMENT

Figure 1:
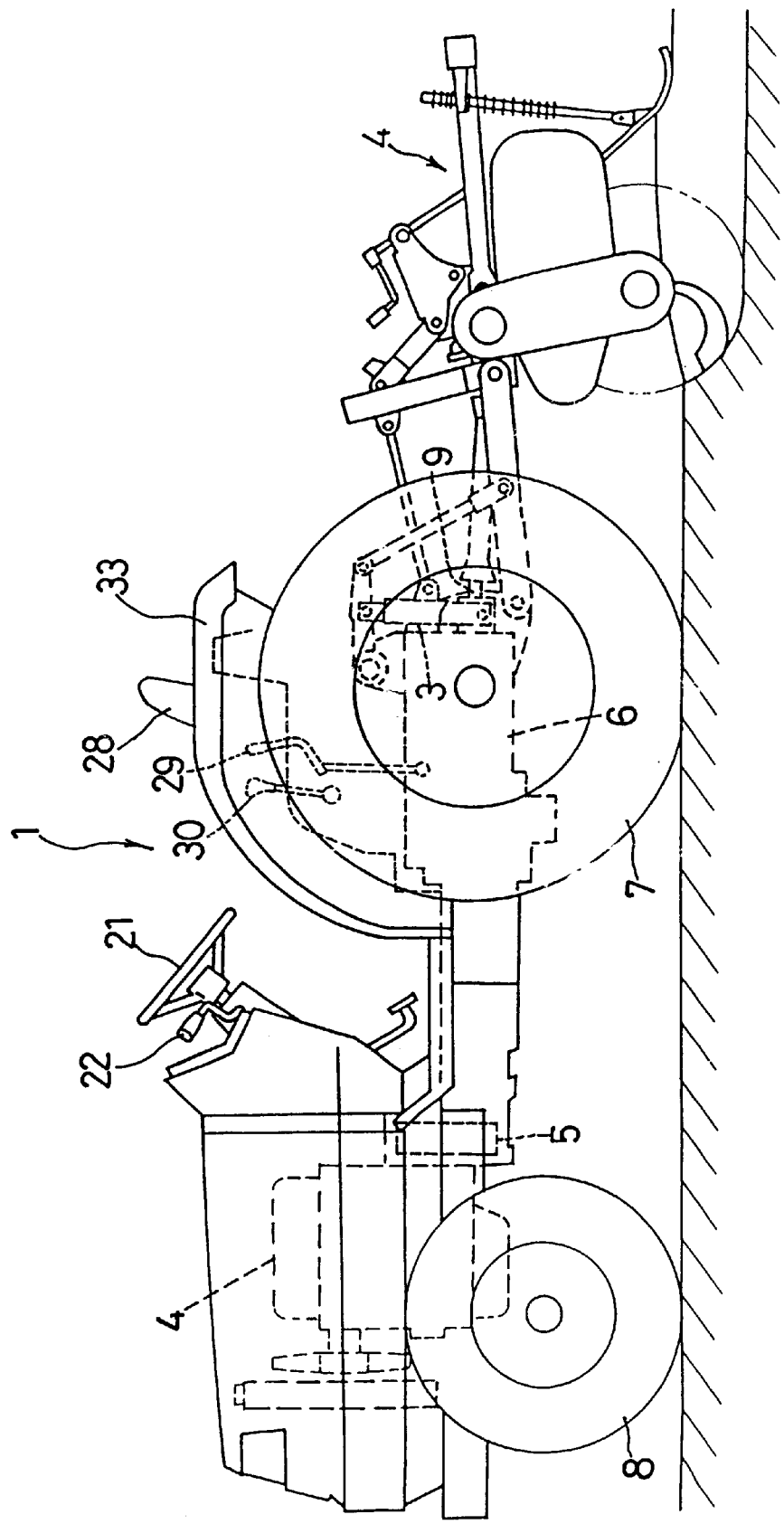
FIG. 1 is a side elevation of an agricultural tractor according to this invention.

FIG. 1 shows a side elevation of an agricultural tractor. This agricultural tractor has a tractor body 1 with a rotary plow 4 coupled to the rear end thereof to be vertically movable by an external lift cylinder 3. Output of an engine 4 mounted on the front of tractor body 1 is transmitted through a main clutch 5 to a transmission case 6 where the power is branched to a propelling line and a PTO line. The power branched to the propelling line is put to an appropriate change speed to drive rear wheels 7 acting as drive wheels and front wheels 8 acting as dirigible wheels. The power branched to the PTO line also is put to an appropriate change speeds and transmitted to the rotary plow 4 through a PTO shaft 9 disposed in a rear position of tractor body 1.

Figure 2:
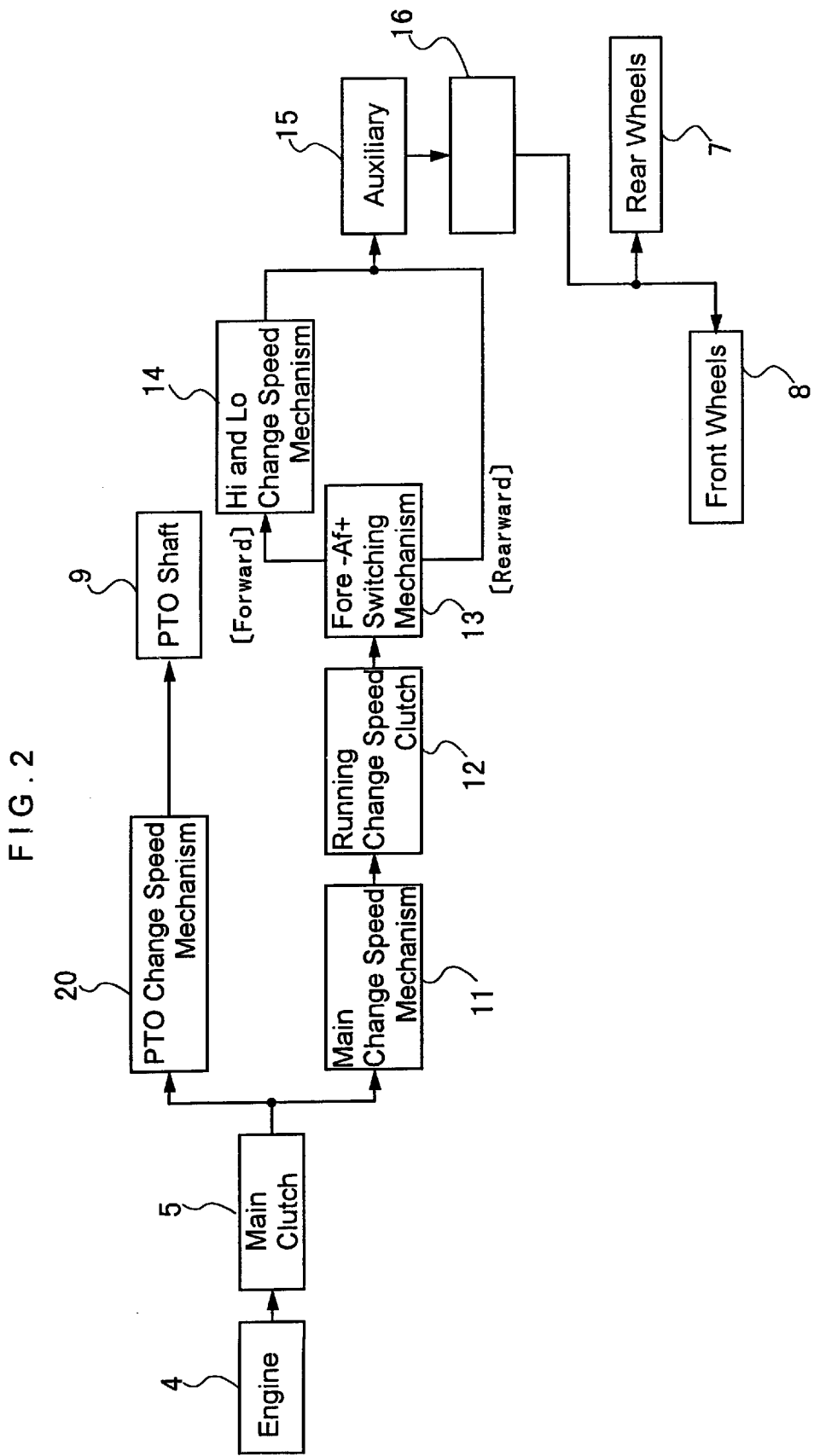
FIG. 2 is a block diagram of a transmission line.
Figure 3:
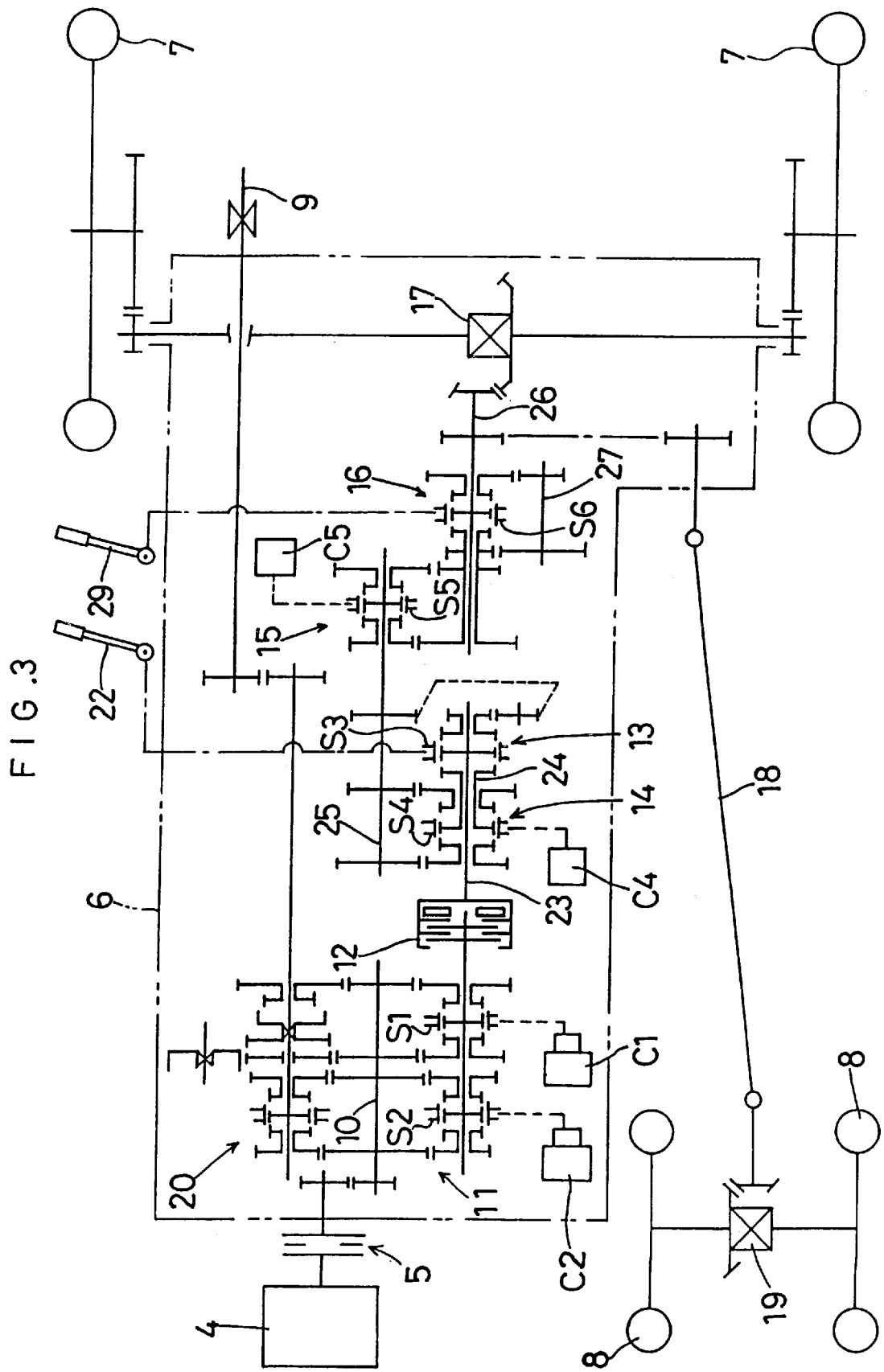
FIG. 3 is a schematic view of the transmission line.

FIG. 2 is a block diagram schematically showing the transmission line. FIG. 3 schematically shows a transmission mounted in the transmission case 6. The engine output transmitted through the main clutch 5 to the transmission case 6 is branched to the propelling line and PTO line through a counter shaft 10. The propelling line includes, arranged in series, a main change speed mechanism 11 for providing four speeds, a multidisk change speed hydraulic clutch 12, a backward and forward drive switching mechanism 13, a high/low change speed mechanism 14 for providing two, high and low, speeds with a small transmission ratio, an auxiliary change speed mechanism 15 for providing two, high and low, speeds with a large transmission ratio, and a super-reduction mechanism 16. The power having undergone change speed operations by these change speed mechanisms is transmitted to the rear wheels 7 through a rear differential 17, and to the front wheels 8 through a transmission shaft 18 and a front differential 19. The PTO line includes a PTO change speed mechanism 20 for changing the power branched thereto by the counter shaft 10 to three forward speeds and one backward speed for transmission to the PTO shaft 9.

As shown in FIG. 3, the main change speed mechanism 11 includes two shift sleeves S1 and S2 shiftable to provide four speeds. The first speed is provided when the shift sleeve S1 is shifted rearward with the shift sleeve S2 maintained in neutral. The second speed is provided when the shift sleeve S1 is shifted forward with the shift sleeve S2 maintained in neutral. The third speed is provided when the shift sleeve S2 is shifted rearward with the shift sleeve S1 maintained in neutral. The fourth speed is provided when the shift sleeve S2 is shifted forward with the shift sleeve S1 maintained in neutral. The shift sleeves S1 and S2 are operable by hydraulic cylinders C1 and C2 acting also as sequence valves, respectively.

The backward and forward drive switching mechanism 13 includes a shift sleeve S3 shiftable forward to provide forward drive and rearward to provide backward drive. The shift sleeve S3 is interlocked to a backward and forward drive switching lever 22 disposed at a left side of a steering wheel 21.

When the backward and forward drive switching mechanism 13 is operated to a forward position, power is transmitted from a transmission shaft 23 at the output side of change speed hydraulic clutch 12 to the high/low change speed mechanism 14 through an intermediate idle shaft 24. The power having undergone a change speed operation by the high/low change speed mechanism 14 is transmitted to the auxiliary change speed mechanism 15 through a change speed shaft 25. When the backward and forward drive switching mechanism 13 is operated to a backward position, power is transmitted from the transmission shaft 23 directly to the change speed shaft 25 without passing through the high/low change speed mechanism 14. That is, the high/low change speed mechanism 14 and backward and forward drive switching mechanism 13 are arranged between the main change speed mechanism 11 and auxiliary change speed mechanism 16, with the high/low change speed mechanism 14 disposed adjacent and downstream, with respect to the direction of power transmission, of a forward drive gear of the backward and forward drive switching mechanism 13.

The high/low change speed mechanism 14 includes a shift sleeve S4 shiftable forward to provide a low speed "Lo" and rearward to provide a high speed "Hi". The transmission ratio between the high speed and low speed is set smaller than the transmission ratio between speed stages provided by the main change speed mechanism 11. The shift sleeve S4 is shiftable by a hydraulic cylinder C4 acting also as a sequence valve.

The auxiliary change speed mechanism 15 includes a shift sleeve S5 shiftable forward to provide a low speed "L" and rearward to provide a high speed "H". The transmission ratio between the high speed and low speed is set larger than the transmission ratio between the speed stages provided by the main change speed mechanism 11. The shift sleeve S5 is shiftable by a hydraulic cylinder C5 acting also as a sequence valve.

The super-reduction mechanism 16 includes a shift sleeve S6 shiftable forward to provide a "super-reduction OFF state" whereby change speed output of the auxiliary change speed mechanism 15 is transmitted directly to a final change speed shaft 26. The shift sleeve S6 is shiftable rearward to provide a "super-reduction ON state" whereby change speed output of the auxiliary change speed mechanism 15 is greatly reduced while passing through a reduction shaft 27, to be transmitted to the final change speed shaft 26. The shift sleeve S6 is operable by a creep shift lever 29 disposed at the left side and rearwardly of a driver's seat 28.

Figure 4:
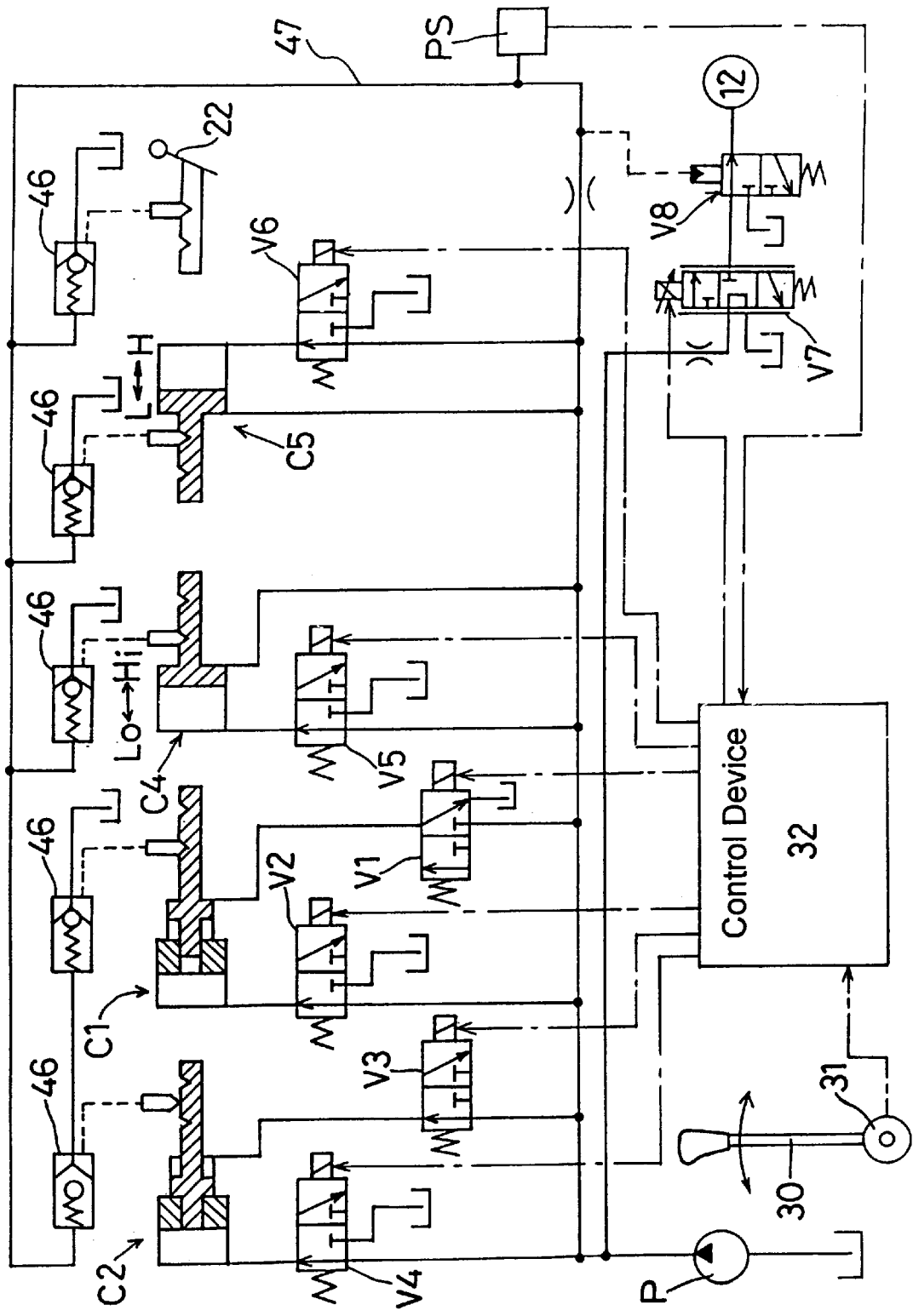
FIG. 4 is a diagram of a hydraulic circuit for change speed controls.
Figure 5:
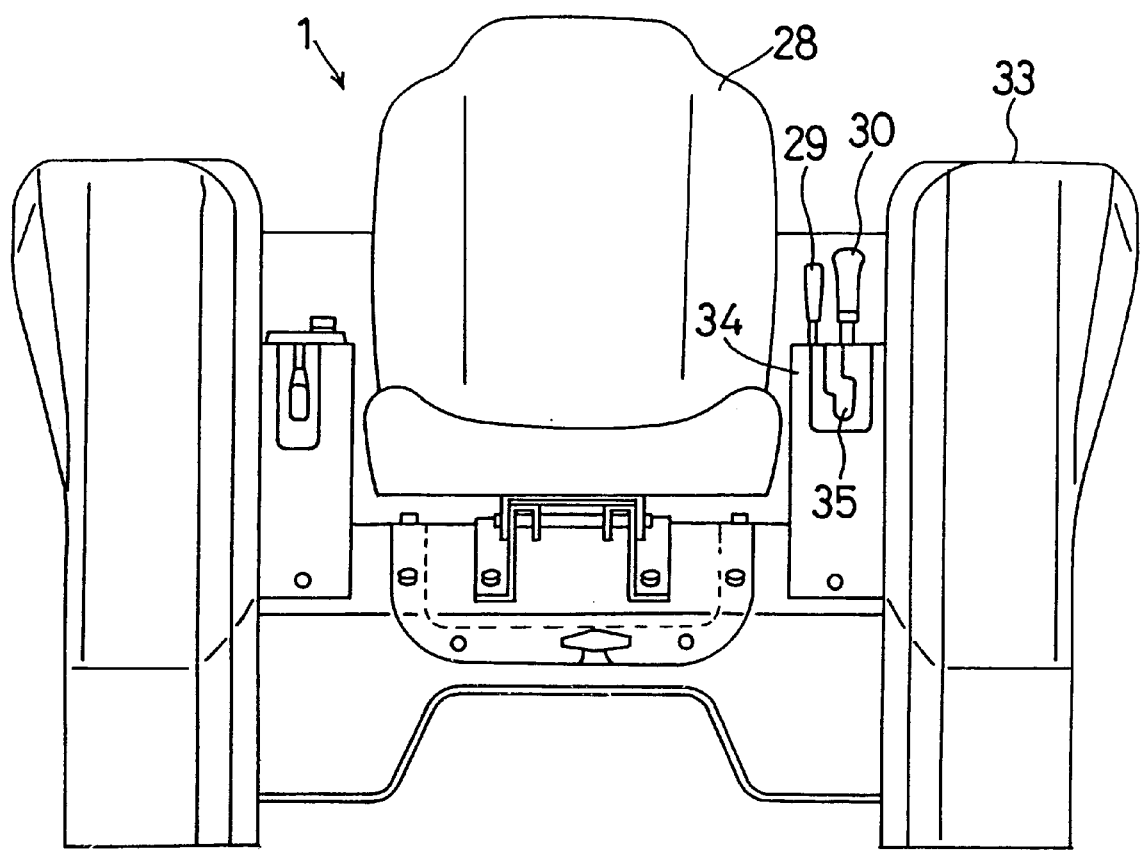
FIG. 5 is a front view of a driving platform.

FIG. 4 shows the hydraulic cylinders C1 and C2 for operating the main change speed mechanism 11, the hydraulic cylinder C3 for operating the auxiliary change speed mechanism 15, the hydraulic cylinder C4 for operating the high/low change speed mechanism 14, and a hydraulic control circuit for controlling the change speed hydraulic clutch 12. In FIG. 4, references V1–V6 denote electromagnetic unloading valves. Reference V7 denotes an electromagnetic proportional control valve. Reference V8 denotes a pilot operated unloading valve. Reference 30 denotes a shift lever disposed at the left side of driver's seat 28 to be rockable fore and aft. Reference 31 denotes a potentiometer for detecting a position to which the shift lever 30 is operated. The electromagnetic unloading valves V1–V6 and electromagnetic proportional control valve V7 are all connected to a controller 32. Thus, when the shift lever 30 is operated, the controller 32 controls these valves to obtain a speed stage indicated by the shift lever 30. The controller 32 performs controls based on a program set thereto. A central portion of this program has commands corresponding to the table shown in FIG. 10. When the shift lever 30 is operated to a first shift position, for example, the controller 32 controls the electromagnetic unloading valves V1–V6 to shift the main change speed mechanism 11 to a first position, the auxiliary change speed mechanism 15 to "L" and the high/low change speed mechanism 15 to "Lo" as shown in FIG. 10.

Figure 6:
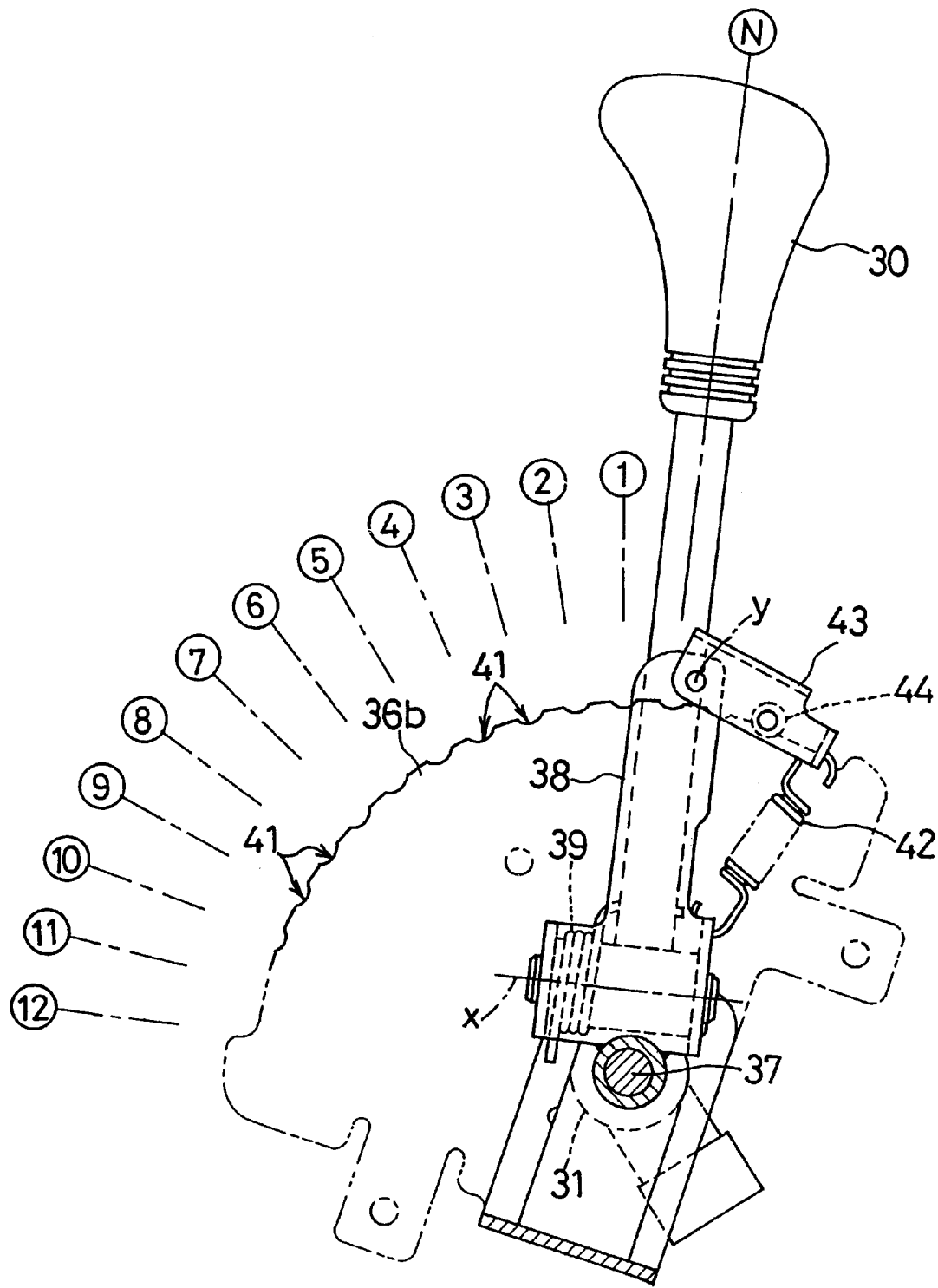
FIG. 6 is a side view of a shift lever.
Figure 7:
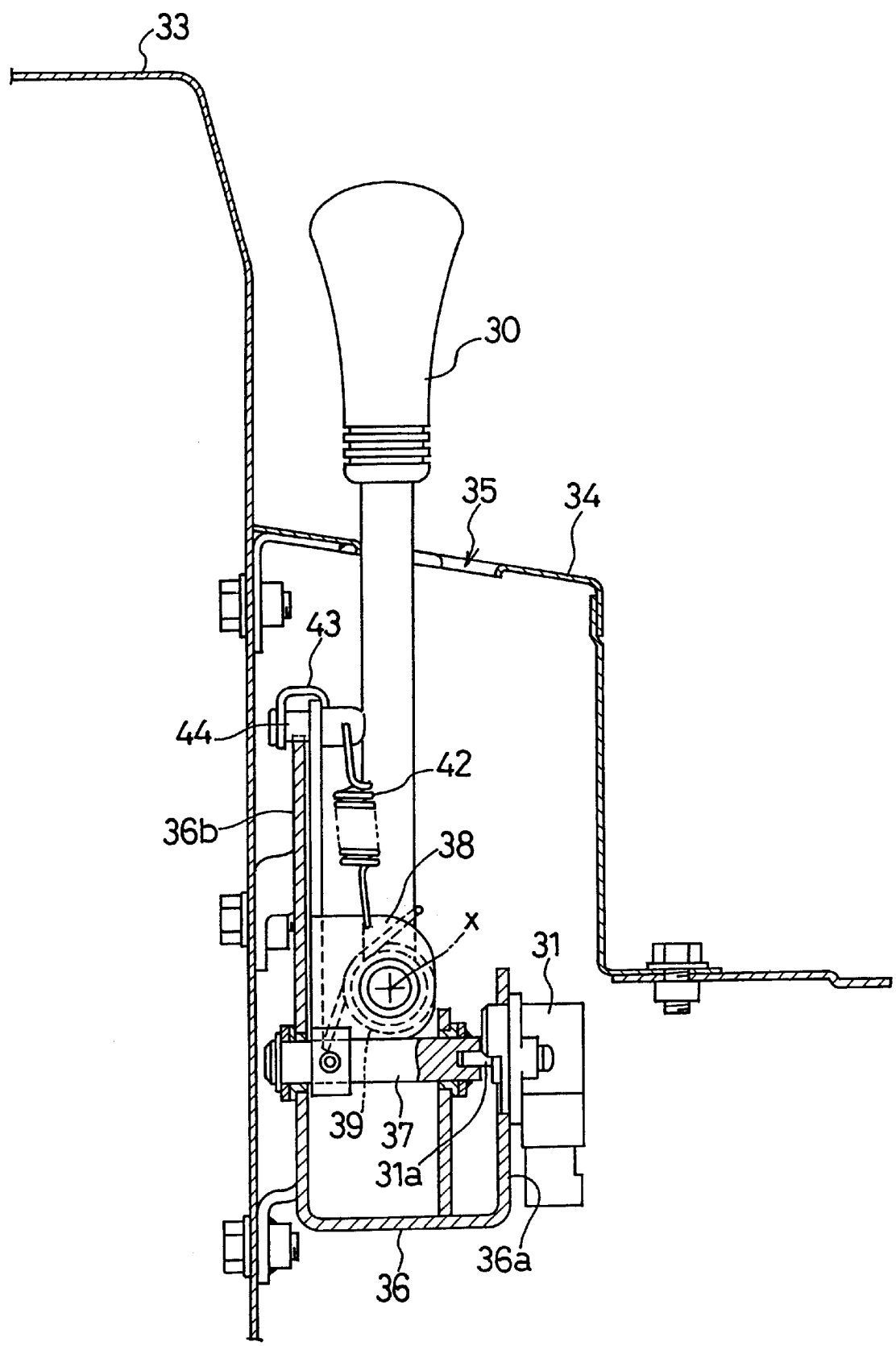
FIG. 7 is a rear view of the shift lever.

As shown in FIGS. 4, 6, and 7, the shift lever 30 projects from a guide groove 35 of a lever guide 34 fixed to an inward wall of a left rear wheel fender 33. The shift lever 30 has a neutral position N at the rear end of its operating stroke, and shift positions for 12 forward stages and 8 backward stages arranged forwardly of the neutral position.

A support bracket 36 formed of sheet metal is fixed to the inward wall of the rear wheel fender 33. The support bracket 36 supports a support shaft 37 extending sideways to be rotatable relative to the bracket 36, with a lever fulcrum member 38 fixed to the support shaft 37. The shift lever 30 has a proximal end thereof pivotally connected to the lever fulcrum member 38 to be rockable right and left about a fore and aft pivotal axis x extending perpendicular to the support shaft 37. The potentiometer 31 is attached to a support piece 36a formed integral with the support bracket 36. The potentiometer 31 has an operating rod 31a thereof coaxially coupled to the support shaft 37. Thus, the potentiometer 31 detects a fore and aft rocking position of the shift lever 30.

Figure 8:
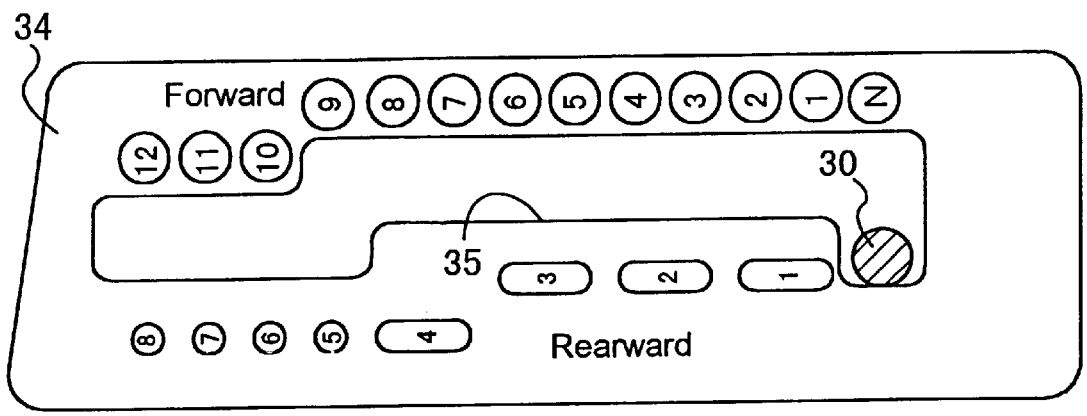
FIG. 8 is a plan view of a shift lever guide.

As best seen in FIG. 6, the shift lever 30 is constantly biased leftward by a torsion spring 39 mounted on the pivotal axis x, whereby the shift lever 30 is guided to move along the left edge of the guide groove 35 which is in a staggered form (FIG. 8).

As shown in FIG. 6, the support bracket 36 has a positioning plate 36b formed integral therewith and upstanding in a sector shape as seen from a side. The positioning plate 36b has an outer peripheral edge defining positioning recesses 41 corresponding to the neutral and 12 shift positions. The lever fulcrum member 38 has a retainer arm 43 attached thereto to be vertically oscillatable about an axis y and biased downward by a spring 42. The retainer arm 43 carries a roller 44 for resiliently fitting into the positioning recesses 41 on the outer peripheral edge of positioning plate 36b, thereby steadily maintaining the shift lever 30 in the neutral and 12 shift positions.

FIG. 10 shows a relationship between the 12 forward speeds provided by operating the shift lever 30, and positions of the main change speed mechanism 11, auxiliary change speed mechanism 15 and high/low change speed mechanism 14.

Specifically, for the first forward speed, the main change speed mechanism 11 is shifted to the first speed position, the auxiliary change speed mechanism 15 to the position for low speed "L", and the high/low change speed mechanism 14 to the position for low speed "Lo". For the second forward speed, the main change speed mechanism 11 is maintained in the first speed position and the auxiliary change speed mechanism 15 in the position for low speed "L", and the high/low change speed mechanism 14 is switched to the position for high speed "Hi". For the third forward speed, the main change speed mechanism 11 is shifted to the second speed position, the auxiliary change speed mechanism 15 to the position for low speed "L", and the high/low change speed mechanism 14 to the position for low speed "Lo". For the fourth forward speed, the main change speed mechanism 11 is maintained in the second speed position and the auxiliary change speed mechanism 15 in the position for low speed "L", and the high/low change speed mechanism 14 is switched to the position for high speed "Hi". For the fifth forward speed, the main change speed mechanism 11 is shifted to the third speed position, the auxiliary change speed mechanism 15 to the position for low speed "L", and the high/low change speed mechanism 14 to the position for low speed "Lo". For the sixth forward speed, the main change speed mechanism 11 is maintained in the third speed position and the auxiliary change speed mechanism 15 in the position for low speed "L", and the high/low change speed mechanism 14 is switched to the position for high speed "Hi". For the seventh forward speed, the main change speed mechanism 11 is shifted to the fourth speed position, the auxiliary change speed mechanism 15 to the position for low speed "L", and the high/low change speed mechanism 14 to the position for low speed "Lo". For the eighth forward speed, the main change speed mechanism 11 is maintained in the fourth speed position and the auxiliary change speed mechanism 15 in the position for low speed "L", and the high/low change speed mechanism 14 is switched to the position for high speed "Hi".

For the ninth to 12th forward speeds, the main change speed mechanism 11 is switched from the fist speed position to the fourth speed position, with the auxiliary change speed mechanism 15 maintained in the position for high speed "H" and the high/low change speed mechanism 14 in the position for high speed "Hi". That is, when the controller 32 determines that the shift lever 30 has been operated to one of the positions corresponding to the ninth to 12th forward speeds, the controller 32 controls the electromagnetic unloading valve V5 corresponding to the high/low change speed mechanism 14 to prevent the high/low change speed mechanism 14 from switching to the position for low speed "Lo". Thus, part of the program set to the controller 32 serves as a check device for preventing the high/low change speed mechanism 14 from being shifted to provide the low speed.

Figure 9:
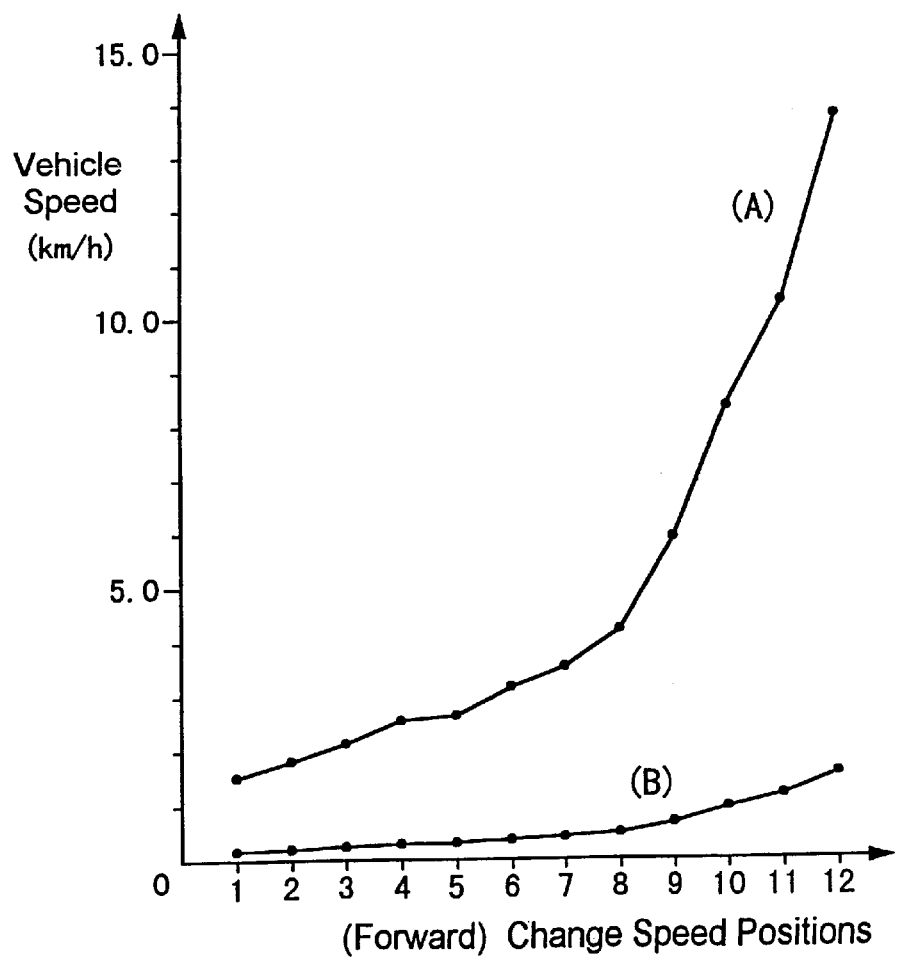
FIG. 9 is a graph of speed distribution characteristics.

FIG. 9 shows one example of forward speed distribution characteristics (a graph of vehicle speeds, with speed stages serving as variables). In FIG. 9, line (A) shows characteristics obtained from an ordinary run with the super-reduction mechanism 16 set "inoperative", while line (B) shows characteristics obtained from an ultra-slow operational run with the super-reduction mechanism 16 set "operative". For an ordinary plowing operation, a low-speed range fom the first to eighth forward speeds with characteristics (A) is selected. For road running, a high-speed range from the ninth to 12th forward speeds with characteristics (A) is selected.

The first to 12th forward speeds with characteristics (A) in FIG. 9 are 1.51, 1.81, 2.13, 2.55, 2.64, 3.16, 3.53, 4.21, 5.91, 8.34, 10.3 and 13.77 (km/h), respectively. That is, with the super-reduction mechanism set inoperative, the speed range for an operational run is set to approximately 1.5 to 4 km/h, and the speed range for a road run to approximately 5 km/h and above.

The first to 12th forward speeds with characteristics (B) are 0.17, 0.20, 0.24, 0.29, 0.30, 0.35, 0.40, 0.47, 0.66, 0.94, 1.16 and 1.55 (km/h), respectively. Thus, with the super-reduction mechanism set operative, vehicle speed at the lowest speed stage is set below 0.2 km/h.

In this way, speed may be changed by finely defined stages in the low-speed range during an operational run. During a road run, speed may be changed by broad and not unduly fine stages.

It will be seen from FIG. 9 that the vehicle speed function for characteristics (A) has a smaller gradient in the low-speed range (first to eighth speeds) than in the high-speed range (ninth to 12th speeds). Preferably, the gradient in the low-speed range is at most half, and more desirably at most ¼ of, the gradient in the high-speed range.

When the backward and forward drive switching lever 22 is operated to a "back" position, power is transmitted from the main change speed mechanism 11 to the auxiliary change speed mechanism 15 without passing through the high/low change speed mechanism 14. Thus, eight speeds are provided by the combination of main and auxiliary change speed mechanisms 11 and 15. That is, in the backward driving state, as shown FIG. 8, the first and second forward speed positions correspond to the first backward speed position. The third and fourth forward speed positions correspond to the second backward speed position. The fifth and sixth forward speed positions correspond to the third backward speed position. The seventh and eighth forward speed positions correspond to the fourth backward speed position. The ninth to 12th forward speed positions correspond to the fifth to eighth backward speed position.

Upon detection of a shift position of shift lever 30, the electromagnetic unloading valves V1–V6 are controlled to shift required shift sleeves S1–S5 by means of hydraulic cylinders C1–C5. The electromagnetic control valve V7 also is controlled at this time. An example of such change speed control will be described hereinafter.

FIG. 4 shows a state for providing the second forward speed where the main change speed mechanism 11 is in the first speed position, the auxiliary change speed mechanism 15 in the position for low speed "L", and the high/low change speed mechanism 14 in the position for high speed "Hi". In this state, the change speed clutch 12 is engaged by pressure oil from a pump P. When the shift lever 30 is moved from the second forward speed position to the third forward speed position, the electromagnetic unloading valves V1, V2 and V5 are reversed and the hydraulic cylinders C1 and C4 are contracted to switch the main change speed mechanism 11 from the first speed position to the second speed position, and the high/low change speed mechanism 14 from the position for high speed "Hi" to the position for low speed "Lo".

When the hydraulic cylinders C1 and C4 begin a shifting operation, check valves 46 are thereby mechanically opened to reduce the pressure in an oil line 47. Then, the pilot operated unloading valve V8 using the pressure in the oil line 47 as a pilot pressure is switched by a return spring to drain pressure oil from the propelling hydraulic clutch 12. The dutch 12 is thereby automatically disengaged to allow smooth shifting of the shift sleeves S1 and S4.

When the shift sleeves S1 and S4 are shifted to predetermined shift positions, the hydraulic cylinders C1 and C4 stop their action for forcibly opening the check valves 46. The check valves 46 are closed again, whereby the pressure in the oil line 47 begins to increase to switch the unloading valve V8 to the position for supplying pressure oil to the propel hydraulic clutch 12. In this case, the pressure increase in the oil line 47 is detected by a pressure sensor PS, which starts a control of an opening degree of the electromagnetic proportion control valve V7. The pressure of pressure oil supplied to propelling hydraulic clutch 12 is gradually increased with a predetermined characteristic, to engage the clutch 12 with no shock.

Though not described, operations for the other speed stages are basically the same as above. The propelling clutch is disengaged during the operation of the shift sleeves. Upon completion of the shifting operation, the propelling clutch is engaged With the predetermined pressure increase characteristic.

The invention may be implemented in the following forms also.

As shown in FIG. 11, a speed stage (ninth forward speed) may be added, where the main change speed mechanism 11 is in the fist speed position, the auxiliary change speed mechanism 15 in the position for high speed "H", and the high/low change speed mechanism 14 in the position for low speed "Lo". This construction provides 13 forward speeds. With this construction, the first to ninth forward speeds may be used for all operational run, and the tenth to 13th forward speeds for a road run.

In this case, the first to 13th forward speeds in an ordinary run with the super-reduction mechanism 16 set "inoperative", preferably, are 1.1, 1.4, 1.6, 2.0, 2.6, 3.3, 3.8, 4.8, 5.5, 6.9, 9.7, 15.7 and 23.2 (km/h), respectively. The first to 13th forward speeds in an ultra-slow operational run with the super-reduction mechanism 16 set "operative", preferably, are 0.13, 0.16, 0.18, 0.23, 0.3, 0.37, 0.43, 0.54, 0.62, 0.77, 1.1, 1.8 and 2.6 (km/h), respectively.

With these vehicle speeds made available, appropriate speeds may be selected to suit agricultural operations. When a plow is attached to the agricultural tractor, for example, a speed of about 5–7 km/h is desirable. When a front loader is attached, a speed of about 3–5 km/h is desirable. Further, when a mower is attached to the agricultural tractor, a speed of about 2–4 km/h is desirable. When a trencher is attached, a speed of about 0.13–1 km/h is desirable.

Figure 12:
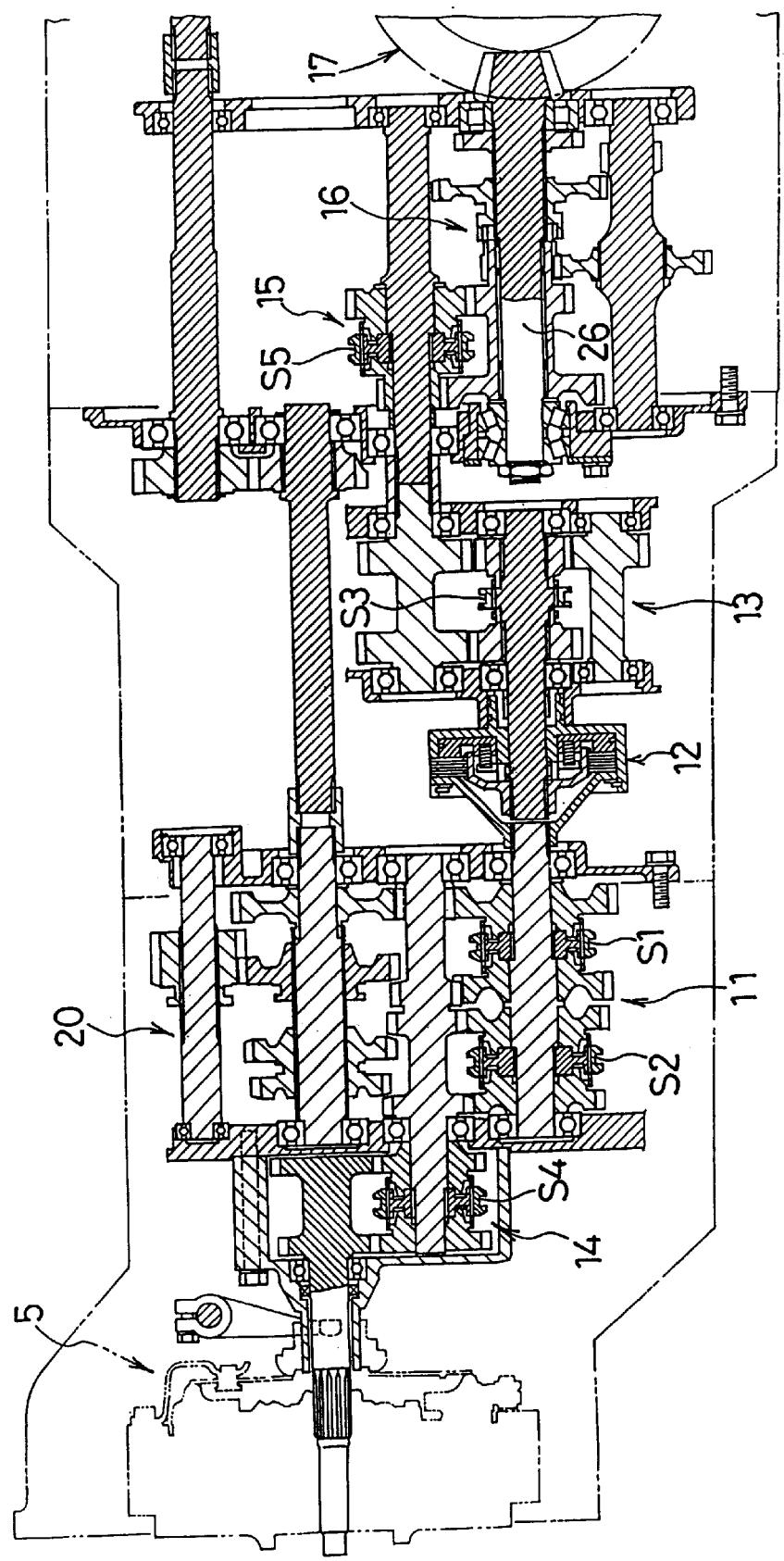
FIG. 12 is a side view of a transmission structure in a further embodiment.

As shown in FIG. 12, the high/low change speed mechanism 14 may be disposed in a most upstream position in the transmission line.

In the foregoing embodiment, the main change speed mechanism 11, auxiliary change speed mechanism 15 and high/low change speed mechanism 14 are operable by the single shift lever 30. This construction may be modified such that the main change speed mechanism 11 and auxiliary change speed mechanism 15 are operable by a single shift lever, and the high/low change speed mechanism 14 operable by a switch mounted on the grip of the shift lever.

The change speed mechanisms per se may be in a form other than the described form shiftable by the hydraulic cylinders. It will be easy to adopt a construction where, for example, a hydraulic clutch is provided for each speed, and a desired speed is produced by selecting a group of clutches.

The high/low change speed mechanism 14 may be the planetary gear type rather than the shift type.

What is claimed is:

1. An agricultural tractor comprising:
    an engine;
    a pair of dive wheels; and
    a propelling transmission disposed between said engine and said drive wheels for transmitting drive from said engine in a plurality of speeds, said propelling transmission including:
        a main change speed mechanism;
        an auxiliary change speed mechanism;
        a high/low change speed mechanism for providing two, high and low, speeds with a smaller transmission ratio than a transmission ratio between speed stages of said main change speed mechanism, wherein said main change speed mechanism, said auxiliary change speed mechanism and said high/low change speed mechanism are arranged in series, and speeds in a low-speed range for an operational run among speeds provided by said main change speed mechanism and said auxiliary change speed mechanism are combined with the two speeds provided by said high/low change speed mechanism; and
        check means for preventing said high/low change speed mechanism from being operated to the low speed, in a high-speed range for a road run among the speeds provided by said main change speed mechanism and said auxiliary change speed mechanism, whereby said high-speed range is combined only with the high speed provided by said high/low change speed mechanism.

2. An agricultural tractor as defined in claim 1, wherein each of said main change speed mechanism, said auxiliary change speed mechanism and said high/low change speed mechanism is controllable by a controller through a corresponding hydraulic cylinder, said check means being part of a program set to said controller.

3. An agricultural tractor as defined in claim 1, wherein said high/low change speed mechanism and a backward and forward drive switching mechanism are arranged between said main change speed mechanism and said auxiliary change speed mechanism, said high/low change speed mechanism being disposed downstream, with respect to a direction of power transmission, of a forward gear of said backward and forward drive switching mechanism.

4. An agricultural tractor as defined in claim 1, wherein said main change speed mechanism, said auxiliary change speed mechanism and said high/low change speed mechanism are operable by a single shift lever.

5. An agricultural tractor as defined in claim 1, wherein eight or nine speeds are set to said low-speed range for an operational run while four or five speeds are set to said high-speed range for a road run.

6. An agricultural tractor as defined in claim 1, further comprising an engageable and disengageable super-reduction mechanism connected in series to said propelling transmission.

7. An agricultural tractor as defined in claim 6, wherein, with said super-reduction mechanism disengaged, said low-speed range for an operational run is approximately 1.5 to 4 km/h while said high-speed range for a road run is approximately 5 km/h and above.

8. An agricultural tractor as defined in claim 6, wherein, with said super-reduction mechanism engaged, a minimum running speed is less than 0.2 km/h.

9. An agricultural tractor as defined in claim 1, wherein, assuming all speeds provided by a combination of said main change speed mechanism, said auxiliary change speed mechanism and said high/low change speed mechanism to be variables, and running speeds corresponding to said all speeds to be a function of said variables, said running speeds have a smaller gradient in said low-speed range than in said high-speed range.

10. An agricultural tractor as defined in claim 8, wherein said low-speed range includes first three speeds while said high-speed range includes three highest speeds.

11. An agricultural tractor as defined in claim 8, wherein said gradient in said low-speed range is at most half a gradient in said high-speed range.

12. An agricultural tractor as defined in claim 8, wherein said gradient in said low-speed range is at most ¼ of a gradient in said high-speed range.

* * * * *

UNITED STATES PATENT AND TRADEMARK OFFICE
CERTIFICATE OF CORRECTION

PATENT NO. : 6,138,528
DATED : October 31, 2000
INVENTOR(S) : Toshiya Fukumoto et al.

It is certified that error appears in the above-identified patent and that said Letters Patent is hereby corrected as shown below:

Column 2 Line 54 "speeds" should read --speed--.

Column 3 Line 46 "16" should read --15--.

Column 7 Line 10 "dutch" should read --clutch--.

Column 7 Line 18 "propel" should read --propelling--.

Column 7 Line 29 "With" should read --with--.

Column 7 Line 40 "all" should read --an--.

Claim 1, Column 8 Line 13, "dive" should read --drive--.

Signed and Sealed this

Eighth Day of May, 2001

*Attest:*

NICHOLAS P. GODICI

*Attesting Officer*   Acting Director of the United States Patent and Trademark Office